(No Model.)

T. H. PALMER.
CARPENTER'S CHISEL.

No. 404,554. Patented June 4, 1889.

WITNESSES:
C. Neveux
C. Sedgwick

INVENTOR,
T. H. Palmer
BY Munn & Co
ATTORNEYS.

UNITED STATES PATENT OFFICE.

THERON H. PALMER, OF SAN BERNARDINO, CALIFORNIA.

CARPENTER'S CHISEL.

SPECIFICATION forming part of Letters Patent No. 404,554, dated June 4, 1889.

Application filed May 22, 1888. Serial No. 274,724. (No model.)

*To all whom it may concern:*

Be it known that I, THERON H. PALMER, of the city and county of San Bernardino, and State of California, have invented a new and useful Improvement in Carpenters' Chisels, of which the following is a full, clear, and exact description.

This invention consists in a chisel or gouge for carpenters' use which has its shank and handle portion bent out of line with its blade or cutting portion and which is provided with an anvil or hammer-block in rear of the blade to form a striking-surface when using a hammer or mallet to force the cutting-tool up to its work, instead of striking on the end of the handle direct, which is liable to split or bruise the handle.

Reference is to be had to the accompanying drawings, forming a part of this specification, in which similar letters of reference indicate corresponding parts in all the figures.

Figures 1 and 2 and Figs. 3 and 4 represent side and top views of a carpenter's chisel or cutting-tool embodying my invention, subject to a slight difference of construction, as hereinafter described.

Although the invention is here represented as applied to a chisel, it is equally applicable to a gouge by simply making the cutting-blade of a gouge instead of a chisel shape.

Figure 1:
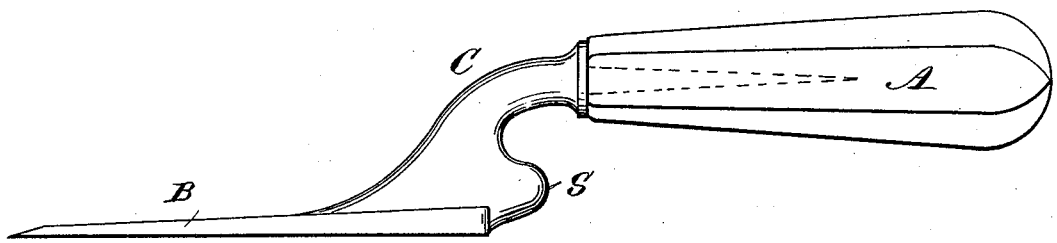
Figure 2:
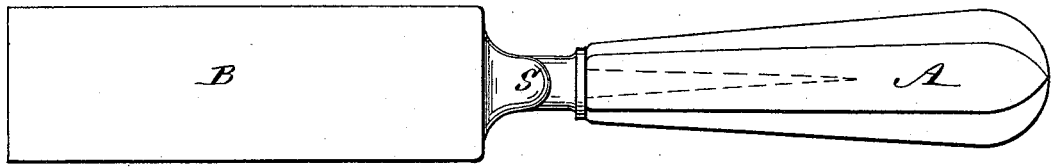
Figure 3:
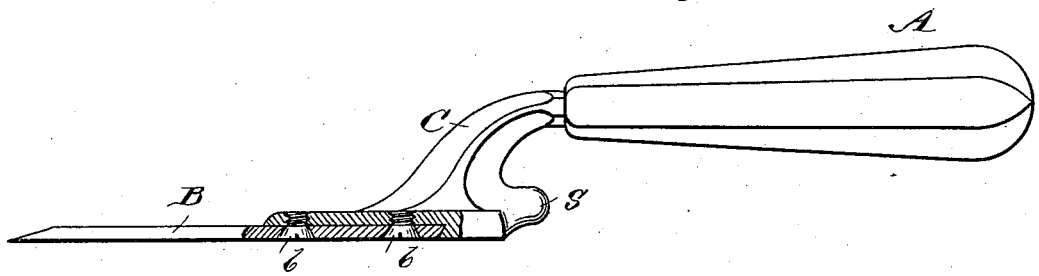
Figure 4:
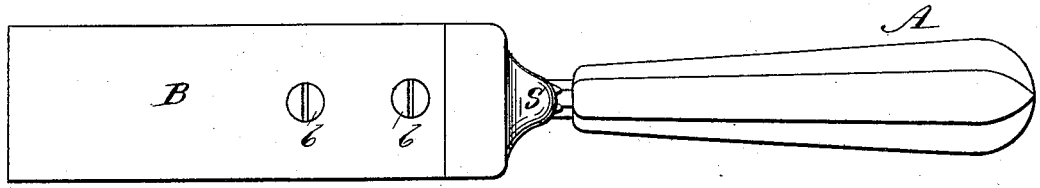

The general configuration of the tool as viewed from its side resembles that of a trowel, its handle A, which may be made of wood, being out of line or plane with the cutting-blade B, which is of steel, and the two joined together by a crooked shank C. This shank C may either be of one and the same piece as the blade B, as shown in Figs. 1 and 2, or it may be of a separate piece of malleable cast-iron or other suitable material and be joined to the blade B by screws $b$ $b$ or otherwise. The shank may be secured in the handle by a simple tang or in any other desired manner. The trowel-like shape of the tool provides for cutting gains across a wide surface without risk of obstruction by the handle, or the tool may be used as a paring-chisel or for cutting and fitting in butts or hinges. The crooked shank C is provided at its back, as nearly in the same plane as the cutting-blade as practicable, with a knob-like projection S, forming a special anvil or hammer-block to receive the blows of a hammer or mallet to force the tool up to or through its work, instead of striking upon the head or back end of the handle, as is usually done, and which is very apt to split or bruise the handle. The trowel-like shape of the tool provides for thus using a special anvil integral with the shank, without interference by the handle.

Having thus described my invention, what I claim as new, and desire to secure by Letters Patent, is—

In a carpenter's chisel or gouge, the forward cutting blade or portion, in combination with the attached crooked shank constructed to receive a handle out of line or plane with said cutting blade or portion and provided with an anvil or hammer-block in rear of the cutting blade or portion, substantially as and for the purposes herein set forth.

THERON H. PALMER.

Witnesses:
JAMES E. MACK,
WALTER D. WAGNER.